(12) United States Patent
Vollmar et al.

(10) Patent No.: US 10,928,178 B2
(45) Date of Patent: Feb. 23, 2021

(54) METHOD AND DEVICE FOR MEASURING THE THICKNESS OF NON-MAGNETISABLE LAYERS ON A MAGNETISABLE BASE MATERIAL

(71) Applicant: Helmut Fischer GmbH Institut für Elektronik und Messtechnik, Sindelfingen (DE)

(72) Inventors: Hans-Peter Vollmar, Stuttgart (DE); Helmut Wersal, Sindelfingen (DE)

(73) Assignee: Helmut Fischer GmbH Institut für Elektronik und Messtechnik, Sindelfingen (DE)

( * ) Notice: Subject to any disclaimer, the term of this patent is extended or adjusted under 35 U.S.C. 154(b) by 48 days.

(21) Appl. No.: 16/212,956

(22) Filed: Dec. 7, 2018

(65) Prior Publication Data
US 2019/0178620 A1 Jun. 13, 2019

(30) Foreign Application Priority Data
Dec. 7, 2017 (DE) .................... 10 2017 129 150.4

(51) Int. Cl.
*G01B 7/06* (2006.01)
*G01B 21/04* (2006.01)

(52) U.S. Cl.
CPC .............. *G01B 7/10* (2013.01); *G01B 7/105* (2013.01); *G01B 21/045* (2013.01)

(58) Field of Classification Search
CPC ......... G01B 7/10; G01B 21/045; G01B 7/105
See application file for complete search history.

(56) References Cited

U.S. PATENT DOCUMENTS 3,986,105 A 10/1976 Nix et al.
4,553,095 A * 11/1985 Schenk, Jr. ............ G01B 7/105
324/230

(Continued)

FOREIGN PATENT DOCUMENTS

DE 24 10 047 A1 9/1975
DE 33 31 407 C2 2/1991
(Continued)

*Primary Examiner* — Akm Zakaria
(74) *Attorney, Agent, or Firm* — Renner, Otto, Boisselle & Sklar, LLP

(57) ABSTRACT

The invention relates to a method for measuring the thickness of non-magnetisable layers (51) on a magnetisable base material (52), the permeability of which is not known, having a measuring probe (11), which has a probe head (17), which comprises a pot core (31) having a first and second coil (36, 37), which lie on a common geometric axis (16), and in which the first and second coils (36, 37) form a first coil pair (38), and which has a bearing calotte (21) in a common axis (16), in which the probe head (17) is placed on the layer (51) to measure the thickness of the layer (51) on the base material (52), wherein a first interaction volume is detected by the first coil pair (38) with a field focusing caused by the pot core (31), a second interaction volume is detected by a second coil par (44) with a first and second coil (42, 43), which is arranged outside the pot core (31) and jointly with the geometric axis (16) without field focusing by the pot core (21), and the detected first and second base material volume is processed in an evaluation device (13) and compared to each other for compensating a permeability of the base material (52), on which the layer (51) to be measured is applied, and a layer thickness is output for the measured layer (51), which is corrected by the influence of the permeability of the base material (52).

12 Claims, 3 Drawing Sheets

(56) References Cited

U.S. PATENT DOCUMENTS

| | | | |
|---|---|---|---|
| 5,191,286 A | 3/1993 | Fischer | |
| 5,648,721 A | 7/1997 | Wincheski | |
| 6,366,083 B1 | 4/2002 | McClelland | |
| 2011/0273171 A1* | 11/2011 | Gehnen | G01R 33/072 |
| | | | 324/244 |

FOREIGN PATENT DOCUMENTS

| | | | |
|---|---|---|---|
| DE | 41 19 903 A1 | 12/1992 | |
| DE | 43 25 767 A1 | 2/1995 | |
| DE | 4325767 A1 * | 2/1995 | ............ G01B 7/105 |
| DE | 60018341 T2 | 4/2006 | |
| DE | 10 2005 054 593 A1 | 5/2007 | |
| DE | 19628220 B4 | 6/2011 | |
| GB | 645777 A | 11/1950 | |
| JP | H11142577 A | 5/1999 | |

* cited by examiner

METHOD AND DEVICE FOR MEASURING THE THICKNESS OF NON-MAGNETISABLE LAYERS ON A MAGNETISABLE BASE MATERIAL

This application claims priority to German Patent Application No. 10 2017 129 150.4 filed on Dec. 7, 2017, which is hereby incorporated herein by reference.

RELATED APPLICATIONS

This application claims priority to German Patent Application No. 10 2017 129 150.4 filed on Dec. 7, 2017, which is hereby incorporated herein by reference.

TECHNICAL FIELD

The invention relates to a method and a device for measuring the thickness of non-magnetisable layers on a magnetisable base material, the permeability of which is not known.

BACKGROUND

A measuring probe for measuring the thickness of thin layers is known from DE 33 31 407 C2. Such a measuring probe has a probe head, which comprises a pot core made of soft iron, which is formed rotationally symmetrically to a geometric axis. The pot core receives a first and second coil on an inner core. On an end face, the inner core is formed as a measuring pole having a bearing face on a layer of a magnetisable base material, said layer being to be measured. As a result of this measuring probe, the determination of a non-magnetisable layer on a magnetisable base material by means of a magnetic-inductive measuring method is made possible.

A measuring probe for measuring the thickness of thin layers is also known from DE 10 2005 054 593 A1, said measuring probe having a probe head, which receives a pot core having a first and a second coil. This first and second coil represents a coil pair, which lies on a common geometric axis. Furthermore, a bearing calotte is provided on the pot core and in the geometric axis. The probe head is mounted on a holding element formed to be elastically resilient, in particular a membrane, opposite a housing. During the placement of the measuring probe on the surface of the layer to be measured, the probe head is slightly submerged into the housing of the measuring probe along the longitudinal axis of the housing. The measuring signals determined by the probe head are forwarded to an evaluation unit in order to determine and output a layer thickness. Such a measuring probe can be used for the magnetic-inductive measuring of the thickness of non-magnetisable layers, meaning that a measuring of the thickness of non-magnetisable layers on a magnetisable base material takes place.

A measuring device for measuring thin layers as well as a method for measuring thin layers having such a device are known from DE 41 19 903 A1. This device comprises a probe having a first and a second coil device, which are arranged coaxially to a common core.

Furthermore, a layer thickness measuring device is known from DE 43 25 767 A1, which comprises a core, which receives a first and second electromagnetic coil lined up one behind the other. An analogous construction is known from DE 24 10 047 A1.

In preparation for such a magnetic-inductive measuring, the measuring probes are calibrated to the magnetisable base material. Such a calibration takes place by means of direct positioning of the measuring probe on the base material, which is provided without a coating for the calibration, and to a base material provided with a layer.

In a plurality of usage situations, such as a layer thickness measurement of lacquers on sheets in the automobile industry, for example, the base material generally to be used is indeed known, though not its exact permeability. Thus, this can result in measuring inaccuracies if the permeability of the base material of the material to be measured deviates from the permeability of the base material used for the calibration.

In addition, measuring the layer thickness on base materials already coated becomes increasingly necessary, without the possibility of placing the measuring probe directly on the base material without coating before the measuring, and calibrating it.

SUMMARY

The object of the invention is to propose a method and a measuring probe for the magnetic-inductive measuring of the layer thickness of non-magnetisable layers on a coated, magnetisable base material, the permeability of which deviates from the base materials used for the calibration or not being known, without resulting in a measuring error in the layer thickness measurement.

This object is solved by a method in which a measuring probe is used, which has a first coil pair having a first and second coil, which are allocated to a pot core and lie in a common geometric axis, and a second coil pair having a first and second coil is allocated to the first coil pair outside the pot core, wherein a first interaction volume is detected by the first coil pair with the field focusing, and an interaction volume is detected by the second coil pair without field focusing, and the first and second interaction volume, in particular first and second measuring signals of the first and second coil pair, are compared to the compensation of a permeability of the coated magnetic base material in an evaluation device, and a layer thickness corrected by the permeability influence of the base material is output. This method enables a high degree of measuring accuracy as a result of the compensation of the permeability of the base material. In addition, the layer thickness measuring can be carried out without the previous exact knowledge of the base material used. In particular, a method for measuring the thickness of non-magnetisable layers on an unknown magnetisable base material is provided. The influence of the permeability of the coated base material can also be compensated by means of deviating alloy components or deviating production and processing procedures, for example, in comparison to a calibration normal, on which the calibration of the measuring probe has been carried out. This enables deviations in the permeability of the base material to be checked of the measuring object in comparison to the calibration normal to be eliminated. A calibration of the measuring probe is not required for the base material to be measured of the measuring object.

The interaction volumes detected during the measuring procedure are preferably evaluated in an evaluation device, and the corrected layer thickness is determined according to the formula $d^{korr}=d^{mess}+\Delta d(\Delta d^{ia},x_n^i)$. Here, the size $d^{mess}$ is the measured layer thickness from the normalised count rate $x_n^i$ of the first and second coil of the inner coil pair. The size $\Delta d(\Delta d^{ia}, x_n^i)$ is a two-dimensional permeability compensation function, which emerges from the layer thickness differences $\Delta d^{ia}=f(\mu_{rk}, x_{nk}^i)$ of the outer and the inner coil pair, which are detected for predetermined permeabilities as a function of the normalised count rate $x_n^i$ of the first coil pair or inner coil pair in the pot core. In particular, knowledge of the permeabilities is no longer necessary. As a result, it is made possible that the influence of the actual permeability of the base material can be eliminated by the permeability compensation function in order to output the correct layer thickness.

Normalised count rate is to be understood as the evaluation of the normalised voltage, wherein $$U_n = \frac{U - U_0}{U_\infty - U_0}$$

applies. Here, $U_0$ is the voltage which arises when the probe is placed directly on the base material and a layer to be measured is not present on the base material. $U_\infty$ is the voltage which arises when the measuring probe is raised, wherein the spacing is so great that the measuring probe is no longer influenced by the magnetisable base material. U is the voltage which arises with a regular spacing, as it is with the layers to be measured on a base material. This results in the normalised voltage $U_n$ always lying between the numbers 0 and 1.

Alternatively, the interaction volumes detected during the measuring procedure can be evaluated in an evaluation device to the effect that the corrected layer thickness is determined according to the formula $d^{korr}=d^{mess}+\Delta d(\Delta x_n^{ia}, x_n^i)$. Here the size $d^{mess}$ is the measured layer thickness from the normalised count rates of the inner coil pair. The size $\Delta d(\Delta x_n^{ia}, x_n^i)$ is a two-dimensional permeability compensation function, which emerges from the deviations of the normalised count rates $x_n^{ia}=f(\mu rk, x_{nk}^i)$ of the outer and the inner coil pair, which are detected for variable permeabilities of the base material as a function of the normalised count rate $x_n^i$ of the first coil pair. In this alternative embodiment, the permeability compensation can thus take place on the basis of the layer thickness deviation and the deviation of the normalised count rate. In particular, knowledge of the permeabilities is no longer required.

A further alternative evaluation of the measuring procedure in an evaluation device provides that this takes place exclusively on the basis of the deviations of the normalised count rate. The interaction volumes detected during the measuring procedure are evaluated, and the corrected layer thickness is determined according to the formula $d^{korr}=f[x_n^{korr}]$. Here, the size $x_n^{korr}$ is determined according to the formula $x_n^{korr}=x_n^{mess}+\Delta x_n(\Delta x_n^{ia}, x_n^i)$. The size $x_n^{mess}$ is the measured normalised count rate of the first and second coils of the inner coil pair. The size $\Delta x_n(\Delta x_n^{ia}, x_n^i)$ is a two-dimensional permeability compensation function for the deviations of the normalised count rates $x_n^{ia}=f(\mu rk, x_{nk}^i)$ of the outer and the inner coil pair. With the corrected count rate, the corrected layer thickness can be calculated directly from the manufacturing calibration initially carried out. In particular, knowledge of the permeabilities is no longer required.

Furthermore, it is preferably provided that a first base calibration for the first and second coil pair is calibrated for several different permeabilities. As a result, layer thickness deviations can be systematically detected by the permeability change of the base material and used in a calibration. The established layer thickness deviations for the inner coil pair represent a first necessary information component for the permeability compensation. The second necessary information component for the compensation represents the layer thickness difference of the layer thicknesses of the first and second coil pair which are differently falsely measured by the permeability deviation for the layer thickness compensation function. The permeability influence on the layer thickness can be eliminated by coupling these two information components.

Advantageously, the first and second coil pair is controlled and operated one after the other in order to detect the respective interaction volumes in the base material to be measured, i.e. to detect the voltage generated. Alternatively, the first and second coil pair can also be operated simultaneously.

The object underlying the invention is further solved by a measuring probe for measuring the thickness of non-magnetisable layers on a magnetisable base material which has a measuring probe having a probe head, which receives a pot core having a first and a second coil, which lie on a common geometric axis and form a first coil pair, and having a bearing calotte arranged in the common axis and a second coil pair, which is arranged outside the pot core and together with the geometric axis, and has a first and a second coil. As a result of such a measuring device, it is made possible that power lines of the first coil par have a focused field course, such that, in the base material, an interaction volume is generated, which is focused, in particular in the region of the pot core, and thus has a high field density. The second coil pair is operated without a field focusing, such that its interaction volume also lies far outside the probe head and thus comprises a clearly greater interaction volume of the base material. This makes it possible that differences in the interaction volume can be determined by the first and second coil pair and varying magnetic properties of the base material can be detected and compensated.

The invention and further advantageous embodiments and developments thereof are described and explained in more detail below by means of the examples depicted in the drawings. The features that can be seen in the description and the drawings can be applied individually or as a plurality in any combination according to the invention. Here are shown:

DETAILED DESCRIPTION

Figure 1:
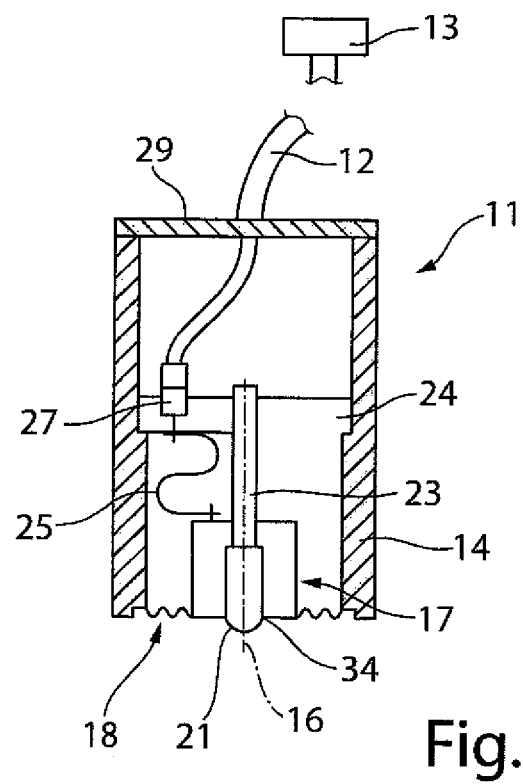
FIG. 1 a schematic sectional view of a first embodiment of a measuring probe.

In FIG. 1, a sectional view of a measuring probe 11 is schematically depicted. The construction of this measuring probe 11 in principle is known from DE 10 2005 054 593 A1, which is referred to in full. The measuring probe 11 is used for the destruction-free measuring of the thickness of layers 51 on a base material 52 of a measuring object 20. This measuring probe 11 is connected to an evaluation device 13 via at least one connection line or control line 12, said evaluation device 13 processing the detected measuring signals and being able to also output them to a display. The measuring probe 11 has a housing 14, which is formed cylindrically, for example. A probe head 17 is arranged in a longitudinal axis 16 of the non-magnetisable housing 14, said probe head 17 being supported by a holding element 18. This holding element 18 is formed as an elastically resilient holding element, in particular as a membrane or as a spring element. The probe head 17 can be shiftably guided by a guiding element 23 along the longitudinal axis 16, such that the probe head 17 can slightly submerge into the housing 14 when placing the measuring probe 11 on the measuring object 20. The probe head 17 is preferably guided in a tilt-free manner by the guiding element 23 on a mount 24 fixed to the housing. Electrical lines 25 of the probe head 17 are connected to an attachment 27 of the line 12, said attachment 27 preferably also being fixed in the mount 24.

The probe head 17 has a bearing calotte 21 lying in the longitudinal axis 16 and pointing towards the measuring object 20.

The probe head 17 can also be introduced into further deviating constructive designs of measuring probes 11.

Figure 2:
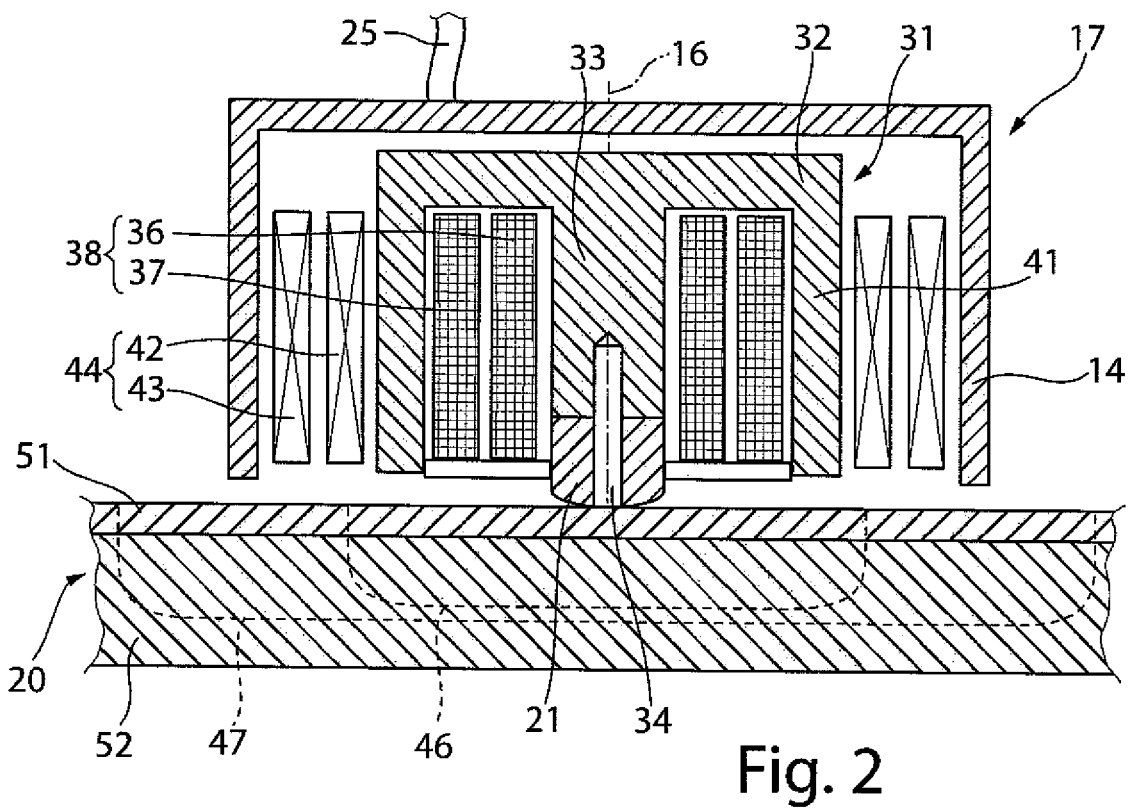
FIG. 2 a schematically enlarged view of a probe head according to the invention of the measuring probe according to FIG. 1, FIG. 3 a diagram for presenting the layer thickness course as a function of the normalised count rate $x_n$ of the inner coil pair of the probe head for 3 different permeabilities of the base material, FIG. 4 a schematic diagram for presenting the resulting layer thickness deviation $\Delta d$ of a permeability $\mu_{r1}$ and $\mu_{r3}$ from FIG. 3, FIG. 5 a schematic diagram for presenting the layer thickness course as a function of the normalised count rate $x_n$ of the inner or outer coil pair for 3 different permeabilities of the base material and the resulting layer thickness difference $\Delta d^{ia}$ with the permeabilities $\mu_{r1}$ and $\mu_{r3}$, and FIG. 6 a schematic diagram for presenting the layer thickness difference $\Delta d^{ia}$ between the two coil pairs for predetermined permeabilities according to FIG. 5 as a function of the normalised count rate of the first coil pair.

In FIG. 2, a schematically enlarged view of the probe head 17 of the measuring probe 11 according to FIG. 1 is depicted. This probe head 17 comprises a pot core 31. This pot core 31 is preferably formed from a soft iron material. In the pot core 31, a core 33, on whose free end the bearing calotte 21 is positioned, extends from the base 32 of the pot core 31. The bearing calotte 21 can have a hardened pin 34.

A first and second coil 36, 37 are arranged in the pot core 31. The first and second coil 36, 37 are aligned coaxially on a common longitudinal axis 16 and form a first coil pair 38. The first coil pair 38 is also referred to as the inner coil pair.

Furthermore, a first and second coil 42, 43 are also provided outside a radial peripheral wall 41 of the pot core 31. The first and second coil 42, 43 are arranged coaxially to each other and preferably aligned in relation to the longitudinal axis 16. The first and second coil 42, 43 form a second coil pair 44, which is also referred to as the outer coil pair.

The outer coil pair 44 and the pot core 31 are surrounded by the housing 14. The housing 14 does not influence the magnetic field of the outer coil pair 44.

The coils 36, 37, 42, 43 comprise at least one electrical conductor, which comprises several windings and is wound up on a coil body.

The probe head 17 rests on the coated measuring object 20 with the bearing calotte 21 for carrying out a measuring. The bearing calotte 21 touches a non-magnetisable layer 51 on the magnetisable base material 52. The power lines generated by the first coil pair 38 have a field focusing as a result of the pot core 31, whereby a first preferably concentrated interaction volume 46 is generated in the base material 52. The second coil pair 44 does not experience any field focusing of the power lines, whereby an interaction volume 47 of the base material 52 that is enlarged in comparison to the first interaction volume 46 is generated.

In order to carry out a measuring of the layer thicknesses, the first coil 36 of the first coil system is periodically energised, for example with a low-frequency current. This first coil 36 is also referred to as the primary coil. As a result, a voltage is induced in the second coil 37 or secondary coil, the size of which voltage depending on the frequency and amplitude of the energisation current of the first coil 36 and on the coupling depending on the interaction volume of the first and second coil 36, 37. The coupling of the first and second coil 36, 37 is, in turn, dependent on the magnetic flow B, which penetrates the two coils 36, 37. The magnetic flow, along with the energisation current, is, in turn, also defined by the magnetic resistance of the surrounding material of the coils 36, 37. If the measuring probe 11 is placed on the magnetisable base material 52, the magnetic field B is increased, because the base material 52, in comparison to the field course, opposes a clearly lower magnetic resistance than air, in comparison to the situation when the probe head 17 is raised from the base material 52. This leads to the increase of the coupling factor of the first and second coil 36, 37 and thus to an increase of the induced voltage. If the distance between the probe head 17 and the base material 52 is increased, the induced voltage in the secondary coil is reduced. Thus, the measurable induced voltage depends on the distance to the base materials 52, i.e. the layer thickness of the layer 51, and can be used for the layer thickness measurement via a calibration. The same also applies analogously to the second coil pair 44.

Figure 3:
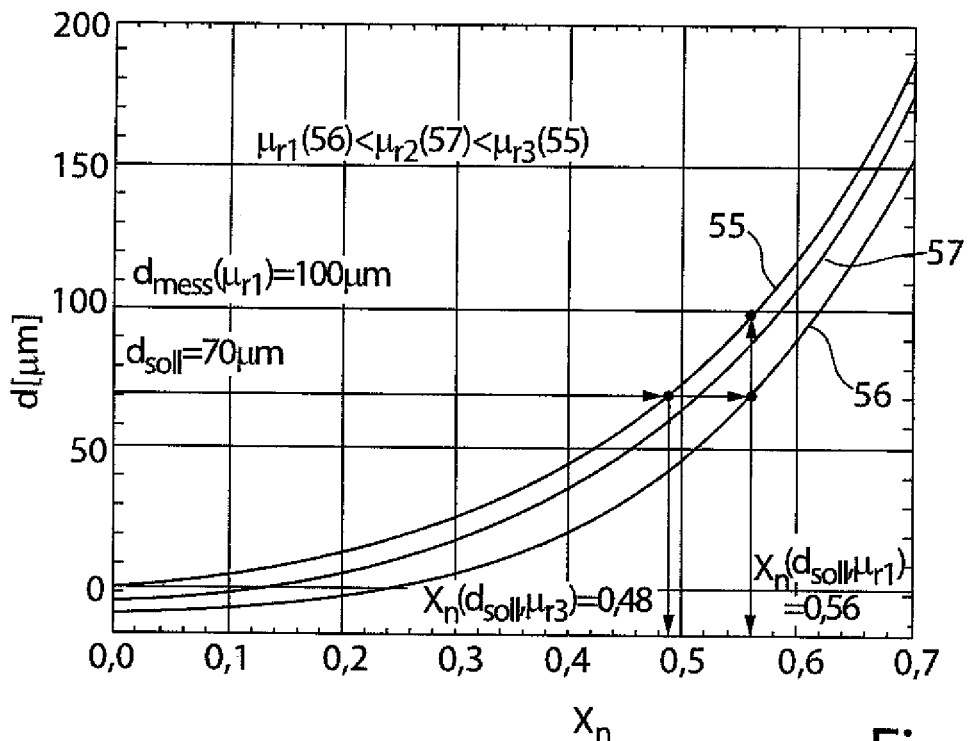

As a result of the field focusing provided with the first coil pair 38 and the field focusing not given with the second coil pair 44, the various interaction volumes 46, 47 of the base material 52 are detected. These resulting differences on the first and second coil pair 38, 44 can be detected when measuring for varying magnetisable properties of the base material 52 and can be used for a compensation of the permeability of the base material 52. The thickness of the layer 51 can be determined with actual knowledge of the permeability of the base material 52 coated with the layer 51. This is discussed below:

FIG. 3 shows a diagram, in which various characteristic curves 55, 56, 57 are plotted for layer thicknesses d as a function of normalised measuring signals $x_n$ depending on a defined base material. A characteristic curve 55 is determined by a calibration of the measuring probe 11 to a defined base material, for example $\mu_{r3}$, and stored in the measuring probe 11 or the evaluating device 13 in the form of coefficients. If this measuring probe 11 is used from now on for measuring on a base material 52 with a permeability deviating therefrom, the characteristic curve course is changed. For example, for a permeability $\mu_{r1}$, the characteristic curve 56 emerges, and for the permeability $\mu_{r2}$, the characteristic curve 57 emerges. Here, it applies that $\mu_{r1}$ is smaller than $\mu_{r2}$, and $\mu_{r2}$ is smaller than $\mu_{r3}$. If the target layer thickness $d_{soll}$ is equal to 70 μm on the calibrated base material 52, a measuring value of 0.48, for example, is the result of this. Caused by the change of the permeability of the base material 52, with a permeability $\mu_{r1}$, the measuring value 0.56 is determined instead. However, the calculation of the thickness with the used calibration characteristic curve 55 thus results in a false layer thickness of $d_{mess}$ equal to 100 μm. Thus, the described layer thickness deviation Δd ($\mu_r$) is the result of the permeability change of the base material. This can be systematically determined and detected in a calibration with predetermined and various permeabilities. As a result, a first necessary information component is detected for a compensation of the permeability with the determination of a corrected layer thickness.

Figure 4:
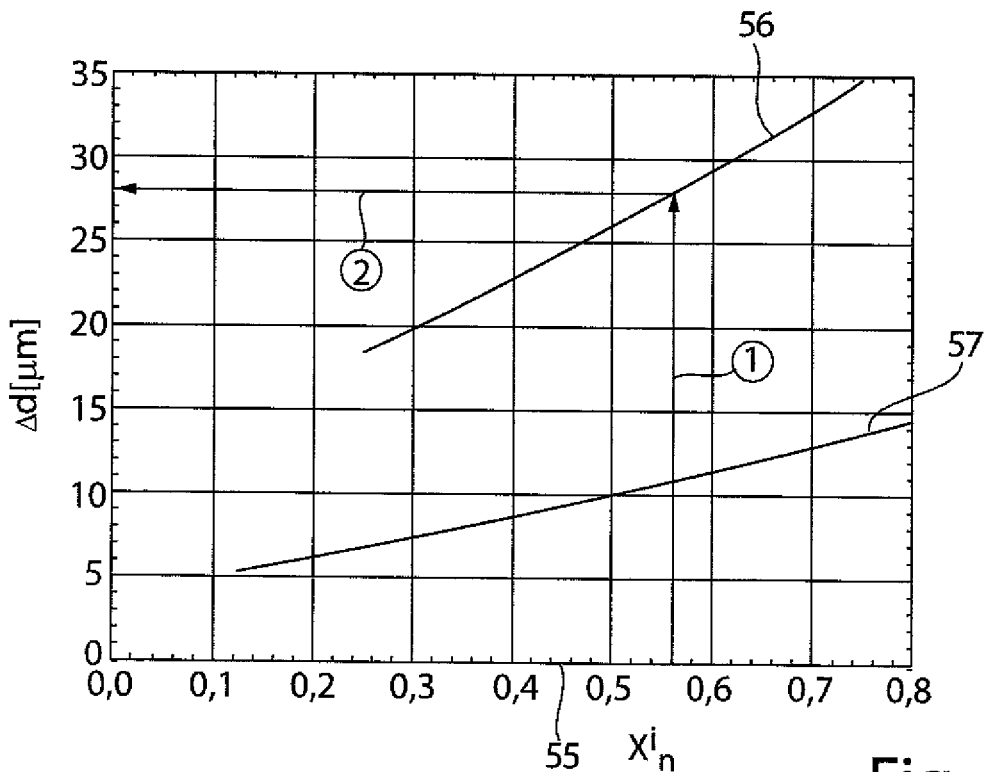

In FIG. 4, a diagram is depicted in which a layer thickness deviation Δd is plotted as a function of the normalised measuring signal $x_n$. These layer thickness deviations are depicted for the permeability $\mu_{r1}$ and $\mu_{r2}$ from FIG. 4. As a result, in the case of the original calibration according to the characteristic curve 55, a line emerges, which lies on the X-axis, whereas, for the permeability $\mu_{r2}$, the characteristic curve 57 emerges and, for $\mu_{r1}$, the characteristic curve 56. This diagram shows the layer thickness deviations with the first coil pair 38. From this, it emerges that, for a permeability $\mu_{r1}$ starting from the value 0.56 according to FIG. 3, a layer thickness deviation of 28 μm, for example, emerges and, in the case of $\mu_{r2}$, a layer thickness deviation of 11 μm, for example, emerges. This is to be corrected.

Figure 5:
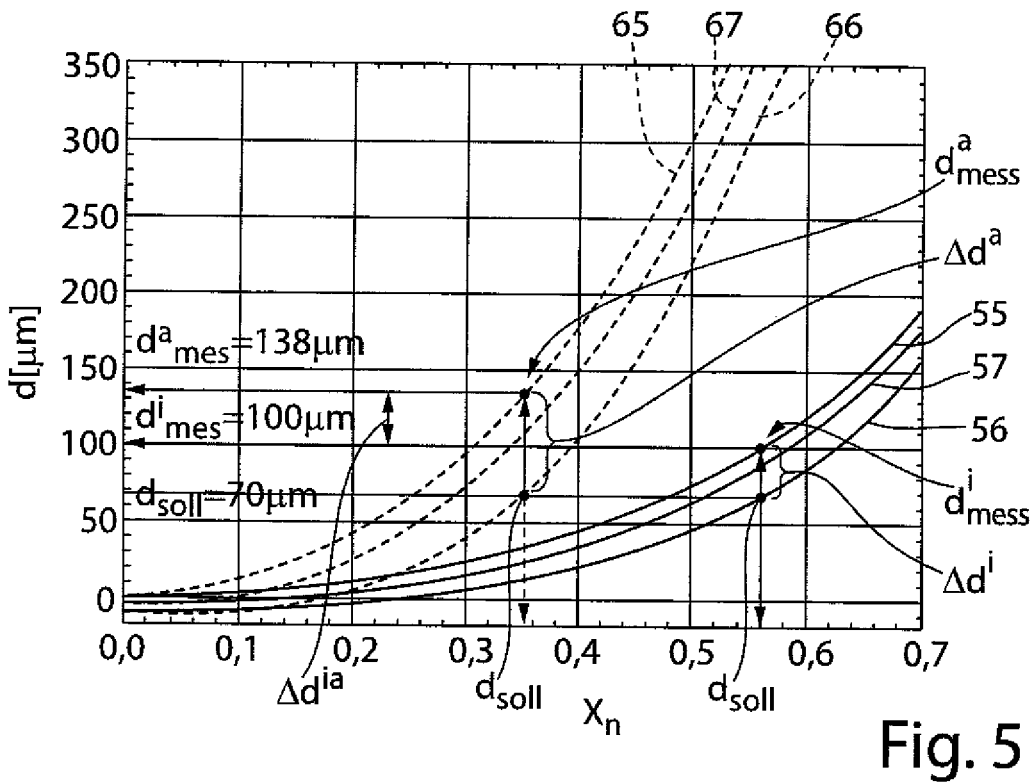

If the first and second coil pair 38, 44 are now considered separately, different characteristic curve courses emerge, as is depicted in the diagram according to FIG. 5. The characteristic curves 55, 56 and 57 for the first or inner coil pair 38 deviate, in turn, from the corresponding characteristic curves 65, 66 and 67 of the second coil pair 44 or the outer coil pair. From this, it also emerges that, as a result of a comparison of the two measuring points, for example with $x_n$ of 0.35 for the coil pair 44 and with $x_n$ of 0.56 for the coil pair 38, the determined layer thickness between the inner and outer coil pairs 38, 44 results in a difference of $\Delta d^{ia}$ of 38 μm, for example (see point 68 in FIG. 6).

Figure 6:
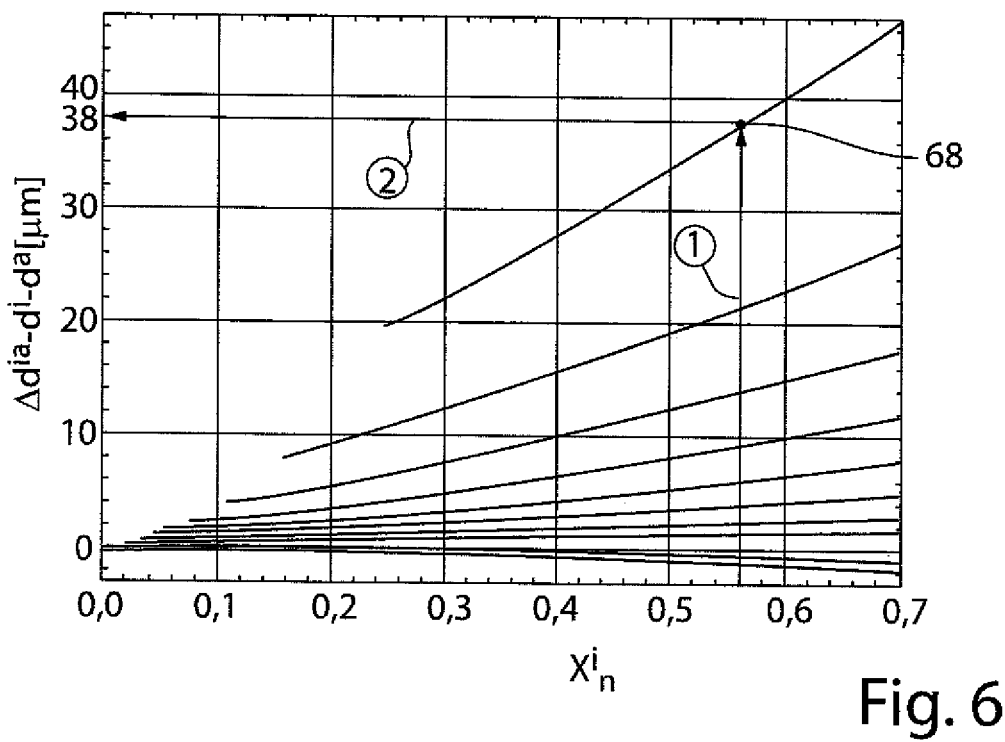

In order to define the permeability from the different dependencies of the first coil pair 38 and second coil pair 44, a difference $\Delta d^{ia}$ of the first and second coil pair 38, 44 can, according to FIG. 6, be considered as a function of the normalised count rate of the first coil pair 38. This dependency $\Delta d^{ia}$ in terms of the permeability of the base material 52 corresponds to the second necessary information component for the compensation of the permeability and can be described for example as a function of the normalised count rate $x_n$ of the inner coil pair 38 as $\Delta d_k (\mu_{rk}, x_{nk}^i) = f(\mu_{rk}, x_{nk}^i)$. This function can be solved according to $\mu_r$ and can be inserted into the function of the layer thickness deviation. As a result, the parameter of the permeability can be eliminated and the desired layer thickness deviation $\Delta d$ is still only a function of the available parameters $\Delta d^{ia}$ and $x_n^i$. From this, a two-parametric permeability compensation function $\Delta d = f(\Delta d^{ia}; x_n^i)$ emerges.

From this, a corrected layer thickness $d^{korr} = d^{mes} + \Delta d (\Delta d^{ia}, x_n^i)$ then emerges. The corrected layer thickness is thus a layer thickness revised by the permeability influence, said layer thickness being able to be measured without the exact permeability of the base material 52 being known or having to be measured.

As a result of such an evaluation and detection of the measuring signals, it is made possible that the measuring probe 11 calibrated to a predetermined permeability is placed on the measuring object 20 with unknown layer thickness and unknown base material 52. The evaluation device 13 determines the normalised count rates $x_n$ of the first and second coil pair 38, 44. From this, the corresponding false layer thicknesses $d_1$ or $d_a$ are calculated via the layer thickness calibration function of the measuring probe 11 and, from this, the internal size of the layer thickness difference $\Delta d^{ia}$. From the two-dimensional permeability compensation function $\Delta d(\Delta d^{ia}, x_n^i)$, the correction necessary for the measuring value can then be added, such that the permeability influence is compensated.

The invention claimed is:

1. A method for measuring a thickness of one or more non-magnetisable layers on a magnetisable base material, in which a permeability of the magnetisable base material is not known, with a measuring device having a measuring probe, which has a probe head, which comprises a pot core having a first and second coil, which lie on a common longitudinal axis, and in which the first and second coil form a first coil pair, and which has a bearing calotte in the common longitudinal axis, and the measuring device having a second coil pair including a third and fourth coil, which the second coil pair is arranged outside the pot core and jointly with the common longitudinal axis, the method comprising:
   placing the probe head on the one or more non-magnetisable layers,
   detecting a first interaction volume using the first coil pair with a field focusing caused by the pot core,
   detecting a second interaction volume using the second coil pair without field focusing by the pot core,
   measuring the thickness of the one or more non-magnetisable layers using the detected first interaction volume and the detected second interaction volume, and
   correcting the measured thickness of the one or more non-magnetisable layers by processing the detected first and second interaction volumes in an evaluation device and comparing the detected first and second interaction volumes to each other to compensate for the influence of the permeability of the magnetisable base material to provide a corrected layer thickness of the one or more non-magnetisable layers, wherein:
   (i) the corrected layer thickness is determined according to the formula $d^{korr} = d^{mess} + \Delta d(\Delta d^{ia}, x_n^i)$, wherein $d^{mess}$ is the measured layer thickness from a normalised count rate of each of the first and second coils of the first coil pair, and wherein $\Delta d(\Delta d^{ia}, x_n^i)$ is a two-dimensional permeability function, which emerges from layer thickness deviations $\Delta d^{ia}$ between the first and second coil pairs and which are used for variable permeabilities of the magnetisable base material as a function of the normalised count rate $x_n^i$ of the first coil pair, or
   (ii) the corrected layer thickness is determined according to the formula $d^{korr} = d^{mess} + \Delta d(\Delta x_n^{ia}, x_n^i)$, wherein $d^{mess}$ is the measured layer thickness from a normalised count rate of each of the first and second coils of the first coil pair, and wherein $\Delta d(\Delta x_n^{ia}, x_n^i)$ is a two-dimensional permeability function, which emerges from layer thickness deviations $\Delta x_n^{ia}$ between the first and second coil pairs and which are used for variable permeabilities of the magnetisable base material as a function of the normalised count rate $x_n^i$ of the first coil pair, or
   (iii) the corrected layer thickness is determined according to the formula $d^{korr} = f[x_n^{korr}]$, wherein $x_n^{korr}$ is determined according to the formula $x_n^{korr} = x_n^{mess} + \Delta x_n (\Delta x_n^{ia}, x_n^i)$ and $x_n^{mess}$ is a normalised count rate of each of the first and second coils of the first coil pair, and wherein $\Delta x_n(\Delta x_n^{ia}, x_n^i)$ is a two-dimensional permeability compensation function, which emerges from deviations of the normalised count rates $\Delta x_n^{ia}$, which is used for variable permeabilities of the magnetisable base material as a function of the normalised count rate $x_n^i$ of the first coil pair.

2. The method according to claim 1, wherein
the corrected layer thickness is determined according to the formula $d^{korr} = d^{mess} + \Delta d(\Delta d^{ia}, x_n^i)$,
wherein $d^{mess}$ is the measured layer thickness from the normalised count rate of each of the first and second coils of the first coil pair, and wherein $\Delta d(\Delta d^{ia}, x_n^i)$ is the two-dimensional permeability function, which emerges from the layer thickness deviations $\Delta d^{ia}$ between the first and second coil pairs and which are used for the variable permeabilities of the magnetisable base material as the function of the normalised count rate $x_n^i$ of the first coil pair.

3. The method according to claim 1, wherein
the corrected layer thickness is determined according to the formula $d^{korr}=d^{mess}+\Delta d(\Delta x_n^{ia}, x_n^i)$,
wherein $d^{mess}$ is the measured layer thickness from the normalised count rate of each of the first and second coils of the first coil pair, and wherein $\Delta d(\Delta x_n^{ia}, x_n^i)$ is the two-dimensional permeability function, which emerges from the layer thickness deviations $\Delta x_n^{ia}$ between the first and second coil pairs and which are used for the variable permeabilities of the magnetisable base material as the function of the normalised count rate $x_n^i$ of the first coil pair.

4. The method according to claim 1, wherein
the corrected layer thickness is determined according to the formula $d^{korr}=f[x_n^{korr}]$,
wherein $x_n^{korr}$ is determined according to the formula $x_n^{korr}=x_n^{mess}+\Delta x_n(\Delta x_n^{ia}, x_n^i)$, and $x_n^{mess}$ is the normalised count rate of each of the first and second coils of the first coil pair, and wherein $\Delta x_n(\Delta x_n^{ia}, x_n^i)$ is the two-dimensional permeability compensation function, which emerges from the deviations of the normalised count rates $\Delta x_n^{ia}$, which is used for the variable permeabilities of the magnetisable base material as the function of the normalised count rate $x_n^i$ of the first coil pair.

5. The method according to claim 1, wherein a first base calibration for the first and second coil pair is carried out before carrying out measurements to determine a layer thickness on several different permeabilities of magnetisable base materials.

6. The method according to claim 1, wherein the first coil pair and the second coil pair are controlled one after the other or simultaneously for detecting the respective first and second interaction volumes.

7. The method according to claim 2, wherein emergence of the two-dimensional permeability function obviates the need for knowledge of the permeability of the magnetisable base material.

8. The method according to claim 3, wherein emergence of the two-dimensional permeability function obviates the need for knowledge of the permeability of the magnetisable base material.

9. The method according to claim 4, wherein emergence of the two-dimensional permeability function obviates the need for knowledge of the permeability of the magnetisable base material.

10. The method according to claim 1, wherein the thickness of the one or more non-magnetisable layers is measured based on a magnetic inductive measurement.

11. A measuring device for measuring the thickness of one or more non-magnetisable layers on a magnetisable base material, the measuring device having a measuring probe, which has a probe head, which has a pot core having a first and a second coil, which lie on a common longitudinal axis, and the first and second coil form a first coil pair, and having a bearing calotte arranged in the common longitudinal axis, wherein a second coil pair having a third and fourth coil is provided outside the pot core and jointly with the common longitudinal axis, said third and fourth coils being aligned coaxially to the common longitudinal axis, the measuring device further comprising an evaluation device; wherein when the measuring device is in use, the evaluation device is configured to:
- process a first interaction volume that is detected by the first coil pair with a field focusing caused by the pot core,
- process a second interaction volume that is detected by the second coil pair without field focusing by the pot core,
- compare the first and second interaction volumes to each other to compensate for the permeability of the magnetisable base material and thereby provide a permeability influence of the magnetisable base material, and
- correct a measured layer thickness of the one or more non-magnetisable layers using the permeability influence of the magnetisable base material to provide a corrected layer thickness of the one or more non-magnetisable layers.

12. The measuring device according to claim 11, wherein the measuring device is configured to measure the thickness of the one or more non-magnetisable layers based on a magnetic inductive measurement.

* * * * *